Jan. 23, 1973  P. R. COLLINGS  3,712,986

ELECTRON IMAGING DEVICE UTILIZING A FIBER OPTIC INPUT WINDOW

Filed April 3, 1969

WITNESSES
Helen M. Farkas
James F. Young

INVENTOR
Peter R. Collings
BY Charles F. Ruoff
ATTORNEY

United States Patent Office 3,712,986
Patented Jan. 23, 1973

---

3,712,986
ELECTRON IMAGING DEVICE UTILIZING A FIBER OPTIC INPUT WINDOW
Peter R. Collings, Horseheads, N.Y., assignor to Westinghouse Electric Corporation, Pittsburgh, Pa.
Filed Apr. 3, 1969, Ser. No. 813,109
Int. Cl. H01j 5/16, 39/00
U.S. Cl. 250—227
2 Claims

ABSTRACT OF THE DISCLOSURE

An electron imaging device in which radiation is directed through a fiber optic input window onto a photoelectric surface. The fiber optic window includes a plurality of fiber optic members in which each of the fiber optics is provided with a non-planar inner surface on which the photoelectric layer is deposited. In this manner, a greater photoelectric response is obtained to a given insert over a planar surface.

BACKGROUND OF THE INVENTION

Electron imaging devices normally consist of an input window on which a photoelectric surface is deposited on the inner surface and is responsive to input radiations. This photoelectric surface generates electrons which are directed onto an output screen or a target member. The electrons are normally accelerated to a high velocity and in some cases multiplied to intensify the output image. In recent years, the industry has resorted to fiber optic input windows in such imaging devices in order to substantially improve the resolution of the image. In most cases, the photoelectric surface is a semi-transparent surface and therefore normally absorbs only a small percentage of the light directed onto the photosurface. If one attempts to increase the thickness of the photoelectric surface in order to absorb more input radiation, then there is a limit to the travel of these excited electrons in the photosurface and therefore further increased sensitivity cannot be obtained in this manner. Other attempts have been made to increase the sensitivity of the photoelectric surface to input radiation by providing reflective surfaces and incorporating greater absorption material in the photoelectric layer.

It is accordingly a general object of this invention to provide an improved electron imaging device which provides a photoelectric surface of higher efficiency in combination with a fiber optic input window.

SUMMARY OF THE INVENTION

This invention is directed to an improvement in the electron imaging device. The device includes an input photocathode in which the radiation image input is directed through a fiber optics input window onto the photosurface. The photosurface in response to the input radiation generates an electron image corresponding to the input radiation. This electron image is then accelerated onto an output screen of a suitable material such as phosphor or onto a storage target from which information may be read out by well known techniques in the art. The improvement in the photocathode structure is obtained by providing a curved or non-planar surface on the input end of each of the fiber optic fibers connecting the input radiation image to the photocathode. In this manner, a greater amount of electrons may be derived from a photoelectric surface in which the thickness of the photoelectric surface is similar to that deposited on a planar surface.

These and other objects and advantages of the present invention will become more apparent when considered in view of the following detailed description and drawings.

DESCRIPTION OF THE PREFERRED EMBODIMENT

Figure 1:
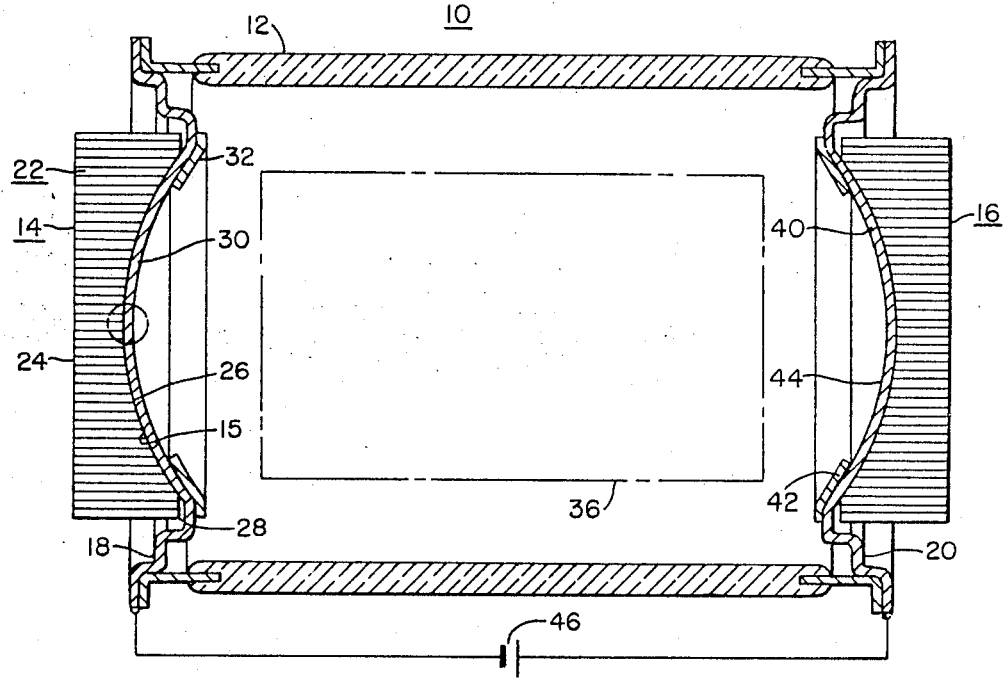
FIG. 1 is a sectional view of an electron imaging device incorporating the teachings of this invention.

Referring in detail to FIG. 1, an image intensifier tube includes an evacuated envelope 10 having a fiber optic input window 14 and a fiber optic output window 16. The envelope 10 comprises a cylindrical portion 12 of a suitable material such as glass with the fiber optic windows 14 and 16 closing off the ends of the cylindrical portion 12. Flange members 18 and 20 secure the input windows 14 and 16 respectively through the envelope portion 12.

Figure 2:
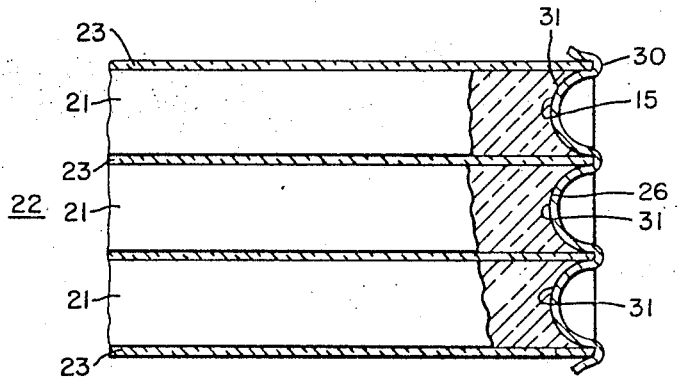
FIG. 2 is an enlarged sectional view of a portion of the input window illustrated in FIG. 1.
Figure 3:
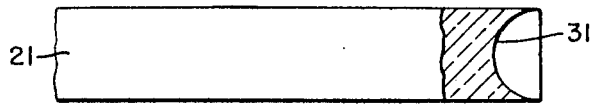
FIG. 3 is an enlarged view of a core fiber.

The input fiber optic window or face plate 14 as shown in FIG. 2 include glass fibers 22 having a core portion 21 of a suitable material such as optical flint glass. The core portion 21 is provided with a cladding 23 of a suitable material such as soda lime or potash soda lead glass. The individual fibers 22 consisting of the core 21 and the cladding 23 are secured together to provide the face plate 14. A suitable material and structure for the fiber optic window 14 is described in U.S. Pat. 3,226,589. The fiber optic face plate 14 is provided with a first face 24 which is substantially in one plane perpendicular to the longitudinal axis of the envelope 10 and the fibers 22. The opposite or second face 26 of the window 14 has an outer peripheral or annular portion 28 substantially parallel to the first face 24 and also an inner concave portion 30. The inner concave portion 30 is provided for optical reason. The surface concave portion 30 is formed in the manner illustrated in FIGS. 2 and 3 so as to provide a concave depression 31 in each of the core members 21. A photoemissive coating 15 of a suitable material such as an S-20 multi-alkali material is provided on the concave portion 30 of the inner surface 26. An annular ring 32 of suitable electrical conductive material such as aluminum may be provided about the photosurface 15 to provide means of applying a potential to the photosurface.

The output window 16 may be similar to the input window 14 with the omission of the concave surfaces 31 on each individual fiber 21. The window 16 is provided with a concave portion surface 40 on the inner surface thereof and a suitable electron responsive phosphor coating 44 is provided on the surface 40. A suitable phosphor is a P-20 such as in cadmium sulfide-silver activated. A conductive coating 42 is provided over the phosphor coating 44 and is in electrical contact with the flange 20.

A suitable potential is provided between the conductive coatings 32 and 42 by means of a suitable potential source illustrated as a battery 46. The potential from the source 46 which may be of the order of 10,000 volts accelerates the electrons emitted from the photoemissive coating 15 into bombardment with the phosphor coating 44 on the output window. The electron excitation of the phosphor coating 44 creates an amplified or converted light image corresponding to the input light excitation directed onto the photocathode 15. A suitable lens system 36 is provided between the photocathode 15 and phosphor layer 42 to focus the electrons emitted from the photocathode 15.

It is found in the above manner, that the sensitivity of the photocathode is substantially increased. The input radiation is confined within a core 21 and travels along the core 21 and strikes the photocathode 15. The light being substantially parallel to the core and not normal to the photocathode surface 15 will have a longer path through the layer 15 in those areas which are other than perpendicular to the axis of the core 21. As a result more of the radiation will be absorbed in the longer paths and greater electron emission will be obtained. The photoemission is also enhanced due to reflection of light. The light being substantially parallel to the core and not normal to the photocathode surface 15 will enter the photocathode layer 15 at such an angle to the normal to the surface that over a substantial part of the surface the light not absorbed in the production of photoelectrons will be internally reflected at the interface between the photosurface and the vacuum. As a result more of the radiation will be absorbed and greater electron emission will be obtained.

One possible method of fabricating the concave surface 31 on the individual fiber cores 21 is to utilize an etchant which etches the glass in the core 21 and does not effect the glass in the cladding 23. In this way, the essentially plan ends of the individual fiber cores 21 are transformed into an irregular or concave shape surface 31 similar to that shown in FIG. 3.

It is obvious that various modifications may be made within the spirit of this invention.

I claim as my invention:

1. A radiation sensitive image device including an envelope and having a radiation transmissive input window, said input window comprising a plurality of glass fibers, each of said glass fibers comprised of a fiber optic core member with cladding parallel to the axis of said device, each of said glass fibers transmissive to input radiation from an exterior end surface to interior end surface, said interior end surface of said fiber optic core recessed below the interior end surface of said cladding, and a radiation sensitive material coating sensitive to said input radiation and emitting electrons in response to said input radiation deposited on the interior end surface of said fiber optic core, said interior end surface of said fiber optic core providing a support for said radiation sensitive coating to allow a substantial portion of said input radiation to enter said radiation sensitive coating from said fiber optic core at an angle substantially different from normal.

2. The device in claim 1 in which said interior surface is a concave surface.

References Cited

UNITED STATES PATENTS

| | | | |
|---|---|---|---|
| 3,058,021 | 10/1962 | Dunn | 313—65 |
| 3,237,039 | 2/1966 | Fyler | 313—92 LF |
| 3,244,921 | 4/1966 | Behun | 313—94 |
| 3,255,003 | 6/1966 | Hays | 313—92 LF X |
| 3,153,172 | 10/1964 | Ling | 250—227 X |
| 3,400,291 | 9/1968 | Sheldon | 250—227 X |

ROBERT SEGAL, Primary Examiner

U.S. Cl. X.R.

313—102